United States Patent
Minakuchi

Patent Number: 5,933,266
Date of Patent: Aug. 3, 1999

[54] SYNCHRONIZATION SIGNAL GENERATING CIRCUIT FOR AN OPTICAL SCANNING DEVICE

[75] Inventor: Tadashi Minakuchi, Tokyo, Japan

[73] Assignee: Asahi Kogaku Kogyo Kabushiki Kaisha, Tokyo, Japan

[21] Appl. No.: 09/048,105

[22] Filed: Mar. 26, 1998

[30] Foreign Application Priority Data

Mar. 27, 1997 [JP] Japan .................................. 9-093083

[51] Int. Cl.$^6$ .................................................. G02B 26/08
[52] U.S. Cl. ........................ 359/196; 359/206; 359/216; 347/250; 250/235
[58] Field of Search .................................. 359/196–226; 250/234–236; 347/235, 250

[56] References Cited

U.S. PATENT DOCUMENTS 5,087,813  2/1992  Negishi .
5,153,604  10/1992 Tutiyasu .
5,708,472  1/1998  Morisawa et al. .
5,739,849  4/1998  Aoki et al. .

FOREIGN PATENT DOCUMENTS 2305807  4/1997  United Kingdom .

OTHER PUBLICATIONS

Copy of a Search Report cited in counterpart U.K. Patent Application No. GB 9806665.7 on Jul. 27, 1998.

*Primary Examiner*—James Phan
*Attorney, Agent, or Firm*—Greenblum & Bernstein, P.L.C.

[57] ABSTRACT

An optical scanning device is comprised of a light source unit, a rotating polygon mirror, an fθ lens, a photosensitive drum, a synchronization signal generating circuit 10, etc. Synchronization signal generating circuit 10 has a photodiode 6, and a resonance circuit 31, comprised of a parallel circuit of coil 32, capacitor 33, and resistor 34, is connected to photodiode 6 as its load circuit. An amplifier 35 is connected to the junction of photodiode 6 and resonance circuit 31, a capacitor 36 is connected to the output side of amplifier 35, and the other end of capacitor 36 is connected to the positive input terminal of comparator 38. A reference voltage generator 39 of variable reference voltage is connected to the negative input terminal of comparator 38 and a reference voltage is applied from this reference voltage generator 39.

17 Claims, 12 Drawing Sheets

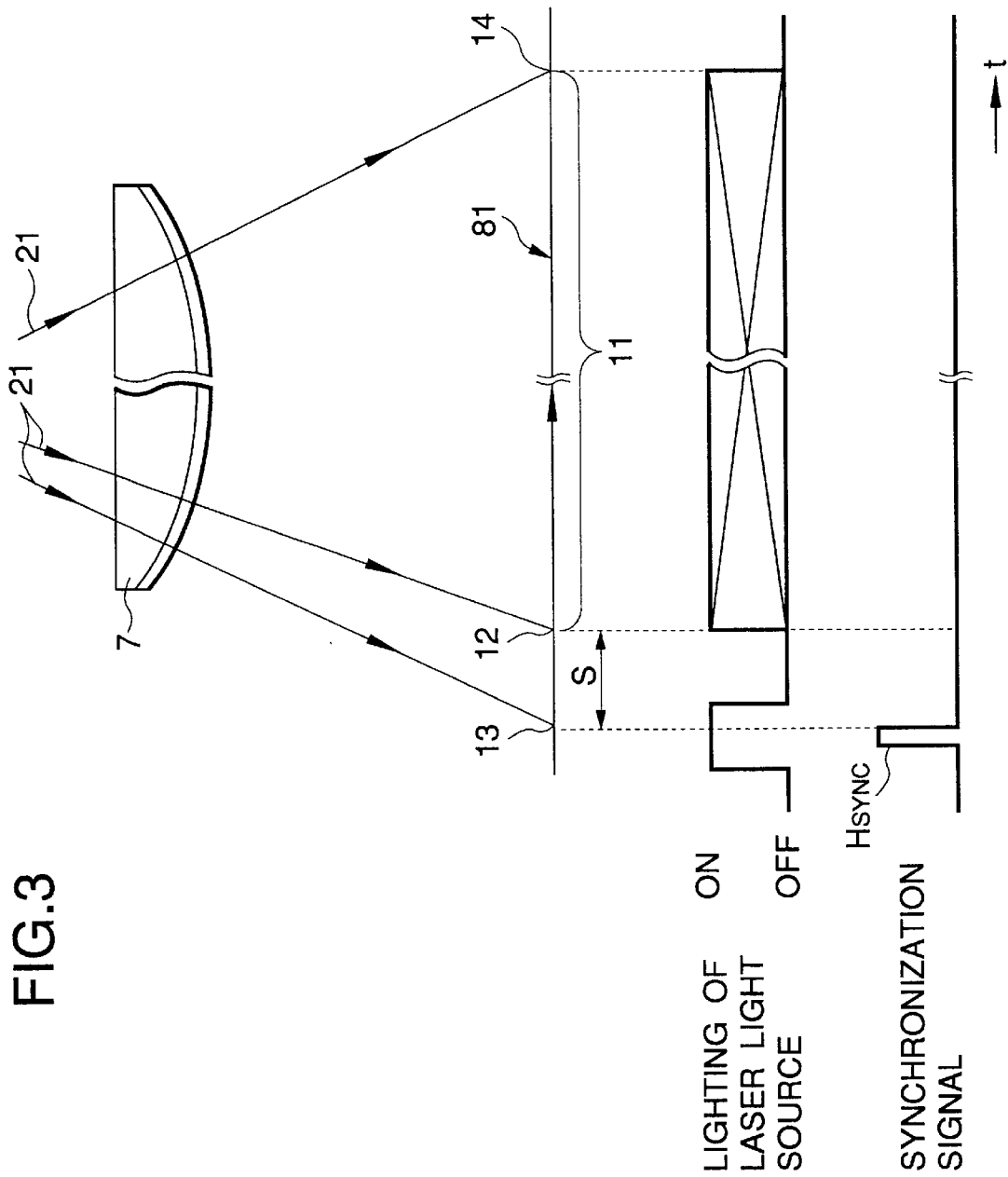

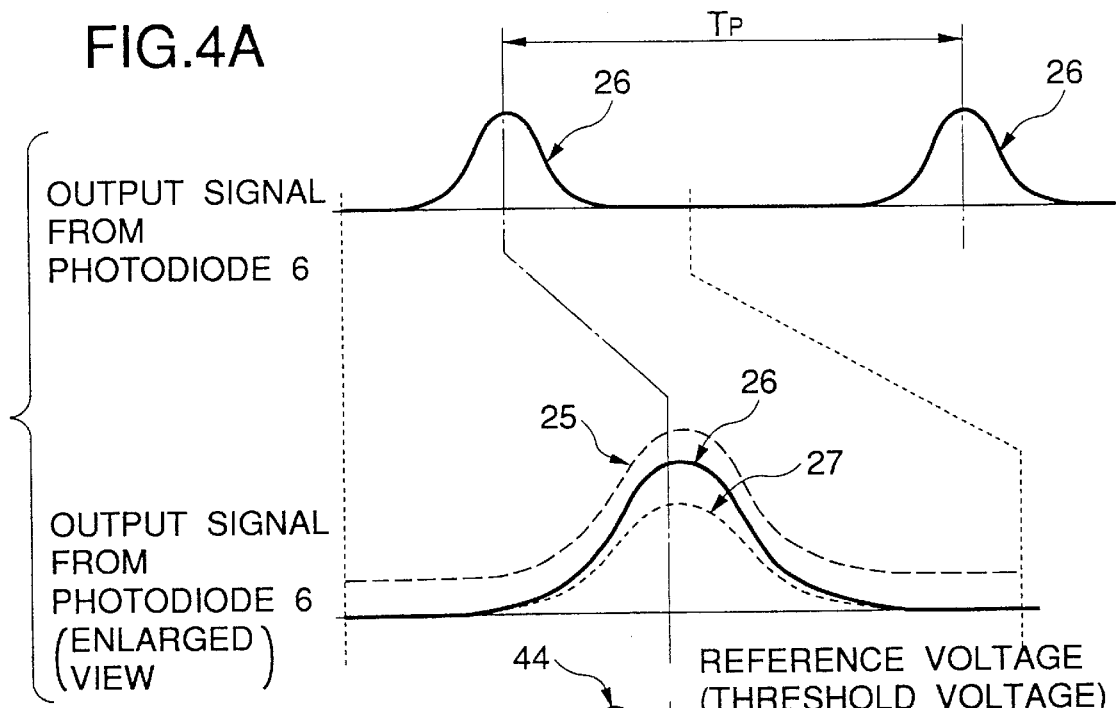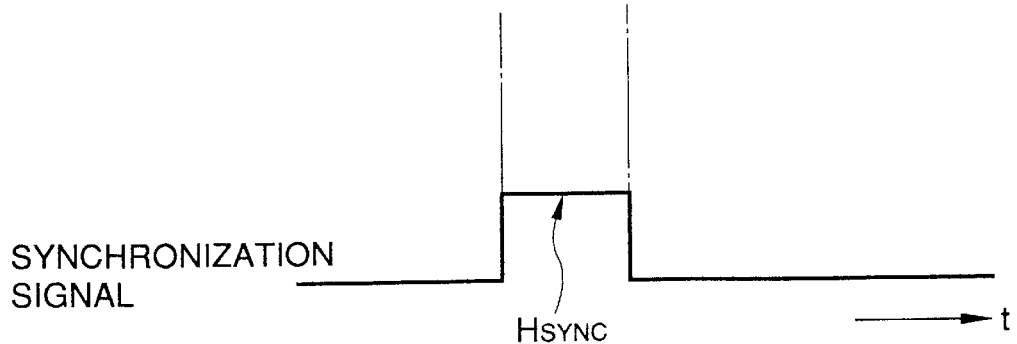

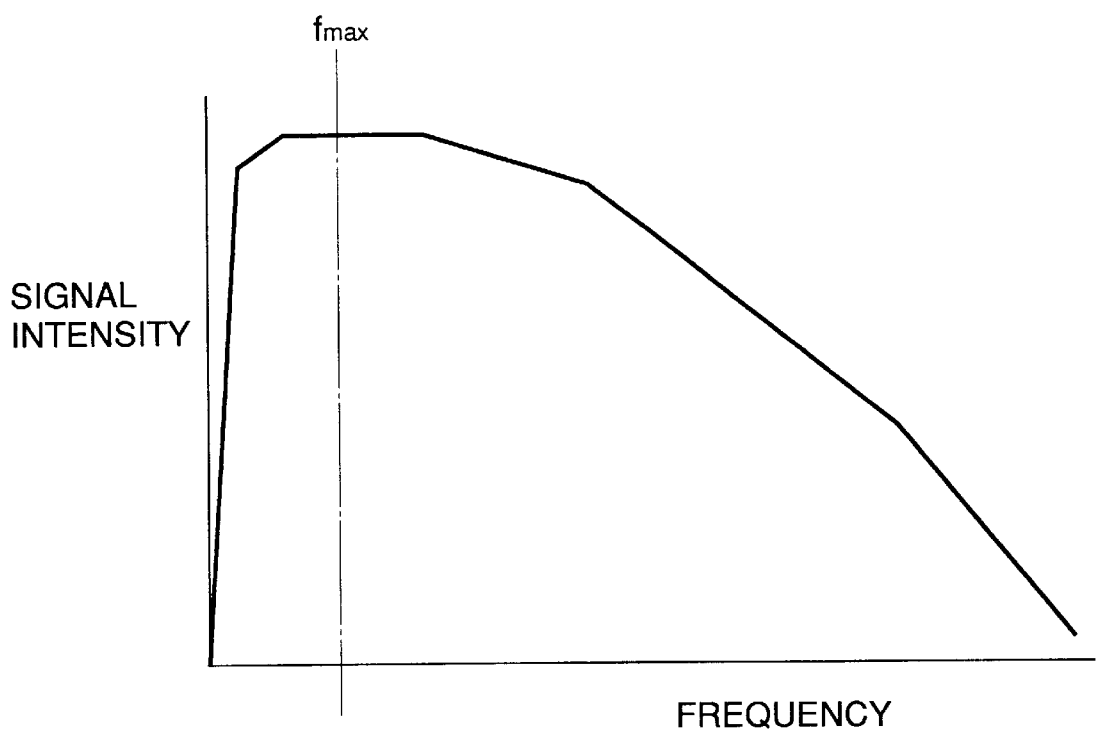

(FREQUENCY SPECTRUM CHARACTERISTICS OF SIGNAL OUTPUT FROM RESONANCE CIRCUIT 31; Q VALUE : SMALL)

(FREQUENCY SPECTRUM CHARACTERISTICS OF SIGNAL OUTPUT FROM RESONANCE CIRCUIT 31; Q VALUE : LARGE)

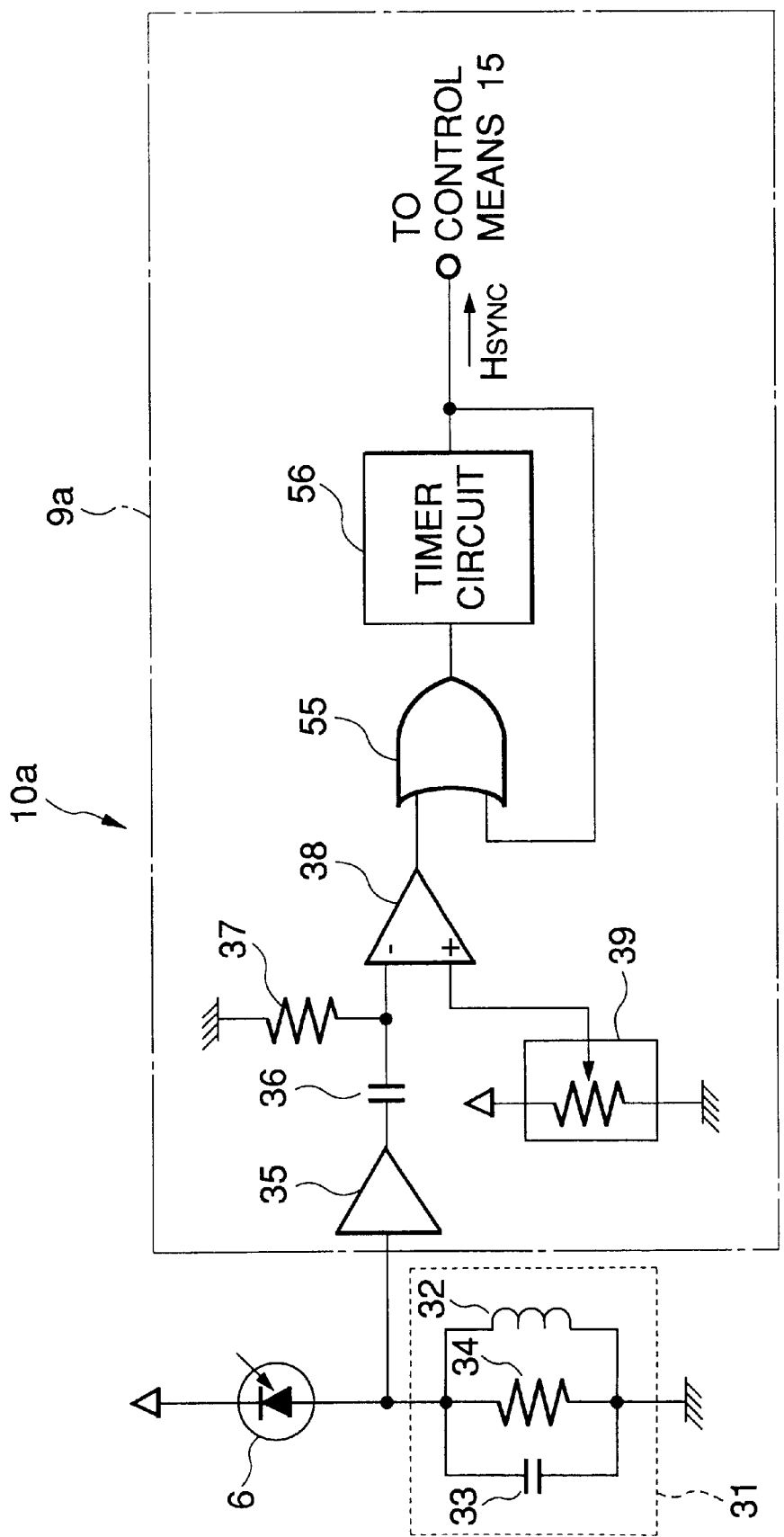

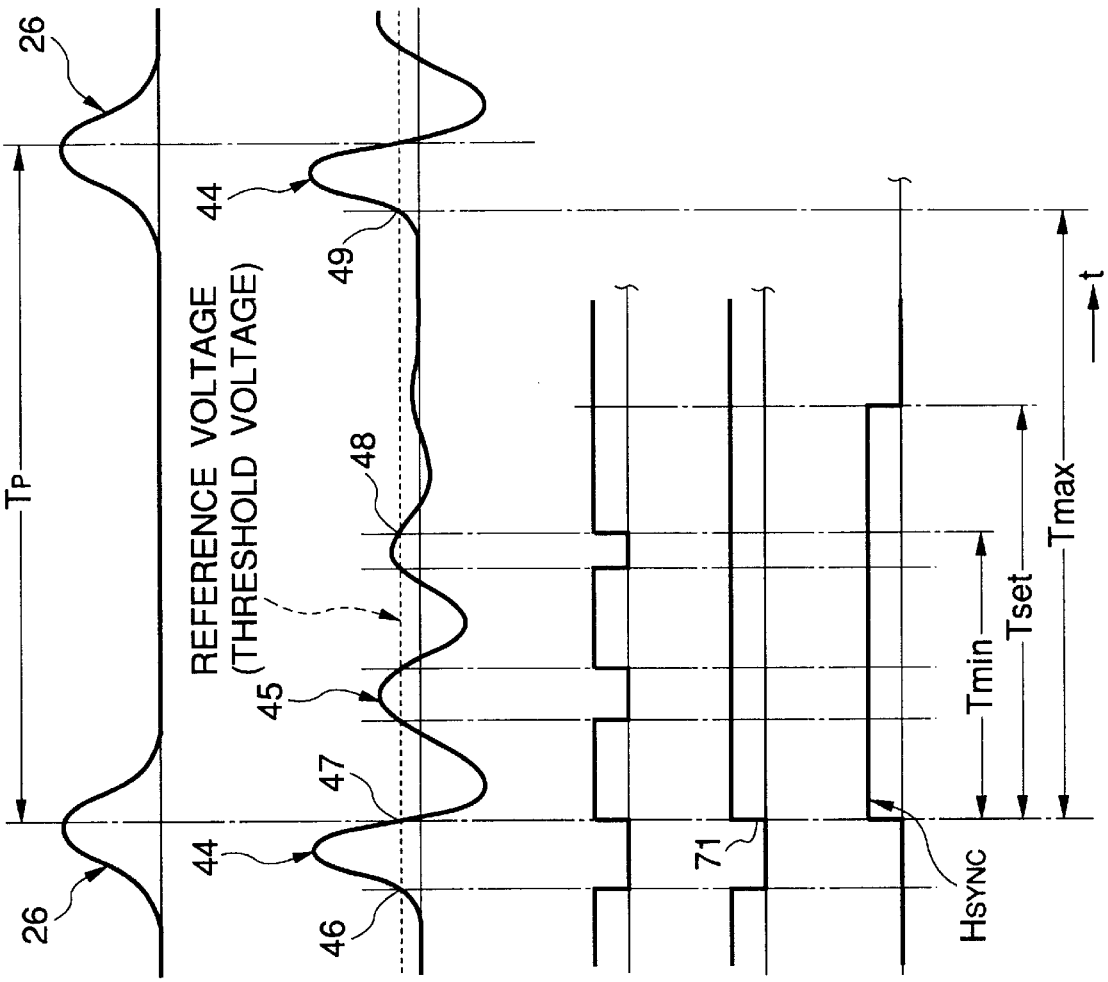

SYNCHRONIZATION SIGNAL GENERATING CIRCUIT FOR AN OPTICAL SCANNING DEVICE

BACKGROUND OF THE INVENTION

1. Field of the Invention

The present invention concerns a synchronization signal generating circuit for an optical scanning device that is used in a laser beam printer, etc.

2. Description of the Related Art

An optical scanning device that is used in a laser beam printer, etc. is arranged so that a laser beam from a light source unit with a laser diode is deflected and scanned in a predetermined direction and in a predetermined angular range by a rotating polygon mirror (polygon mirror) and this deflected and scanned laser beam is converged onto the photosensitive surface of a photosensitive drum via an fθ lens to thereby obtain a scanning light beam that moves at uniform speed in the direction of the axis of rotation of the photosensitive drum.

In a laser beam printer, the laser beam is optically modulated at the light source unit of the optical scanning device on the basis of drawing data, the photosensitive drum is rotated based on the timing of scanning operation by the optical scanning device, an electrostatic latent image that corresponds to the drawing data is formed on the outer peripheral surface (light receiving surface) of the photosensitive drum, toner is adsorbed onto the outer peripheral surface of the photosensitive drum in correspondence with the electrostatic latent image, and this toner image is transferred (drawn) onto the recording paper.

In such an optical scanning device for a laser beam printer, a synchronization signal (horizontal synchronization signal) HSYNC is generated for recognition of the scanning starting position on the light receiving surface of the photosensitive drum, in other words, the drawing starting position on the recording paper, and arrangements are made to detect synchronization signal HSYNC and to start drawing after the elapse of a certain amount of time from synchronization signal HSYNC.

As shown in FIG. 12, a photodiode 6 is installed at a position outside the drawing range and separated from the drawing starting position by a predetermined distance in the main scanning direction, and synchronization signal HSYNC is generated and detected on the basis of a signal output upon photoelectric conversion of the laser beam received by the light receiving surface of photodiode 6.

The conventional synchronization signal generating circuit 100, which detects synchronization signal HSYNC in this case, is comprised of photodiode 6, a resistor 41, which is the load circuit of photodiode 6, an amplifier 35, a comparator 38, and a reference voltage generator 39.

As shown in FIG. 13, when the laser beam is illuminated onto the light receiving surface of photodiode 6, a current, in other words, a signal of a magnitude that corresponds to the amount of light received is output from photodiode 6. This signal is converted into voltage by the load circuit (resistor 41), amplified by amplifier 35, and then input into comparator 38. At comparator 38, the abovementioned signal is compared with a reference voltage (threshold voltage) that is output from reference voltage generator 39 and a rectangular synchronization signal HSYNC, which rises at crossing point 42 and falls at crossing point 43, is generated and output. The timing at which this synchronization signal HSYNC falls is used for the detection of the scanning starting position on the light receiving surface of the photosensitive drum, in other words, the drawing starting position on the recording paper.

However, the signal output from photodiode 6 may fluctuate because of fluctuations of the amount of light received by photodiode 6 due to fluctuations of the laser beam output, tilting of the faces of the rotating polygon mirror, etc., mixing in of unwanted signal components (noise), influences of the fluctuations, etc. of the DC component of the circuit due to the dark current, etc., and this may cause the pulse width of synchronization signal HSYNC, in other words, the timing at which synchronization signal HSYNC rises and falls to fluctuate and thus make difficult highly precise detection of synchronization signal HSYNC.

The above can cause, for example, variations in the timing of the rise or fall of synchronization signal HSYNC, disturbance of the drawing starting position, and the lowering of the quality of drawing (printing).

SUMMARY OF THE INVENTION

The present invention has been made to solve the above problems with the prior art, and therefor an object of the present invention is to present a synchronization signal generating circuit for optical scanning device which is capable of generating a synchronization signal in a stable manner.

The above object is achieved by (1) to (17) below of the present invention.

(1) A synchronization signal generating circuit for an optical scanning device which deflects a light beam that enters from a light source and emits the light beam as a scanning light beam that moves at a uniform speed in a predetermined direction, said synchronization signal generating circuit comprising:
  a detection means, comprised of a light receiving element, which detects that the scanning light beam has reached a predetermined position within the scanning range, and a resonance circuit, which is connected to the light receiving element, has a predetermined resonance frequency, and performs band limiting of the signal from the light receiving element; and
  signal processing circuit, which generates, based on the signal from the detection means, a synchronization signal for specifying the starting position of scanning by the scanning light beam.

(2) A synchronization signal generating circuit for optical scanning device as set forth in (1) above, wherein the resonance circuit is arranged to resonate at or near the frequency at which the frequency spectrum of the signal output from the light receiving element takes on the maximum value.

(3) A synchronization signal generating circuit for optical scanning device as set forth in (1) or (2) above, wherein the signal processing circuit is arranged to generate the synchronization signal upon comparing the signal from the resonance circuit with a reference signal.

(4) A synchronization signal generating circuit for optical scanning device as set forth in (3) above, wherein the timing, at which the signal from the resonance circuit matches the level of the reference signal again after reaching the level of the reference signal once, is used for setting the scanning starting position.

(5) A synchronization signal generating circuit for optical scanning device as set forth in (4) above, wherein the resonance circuit is arranged so that the signal that is input from the resonance circuit into the signal processing circuit will be attenuated so that it will not reach the level of the reference signal after matching the level of the reference signal again.

(6) A synchronization signal generating circuit for optical scanning device as set forth in (1) or (2) above, wherein the signal processing circuit has a comparator, which compares the signal from the resonance circuit with a reference signal, and a timer circuit, which is started up on the basis of the output of the comparator and outputs a signal of a predetermined level for a predetermined period starting from the point of startup.

(7) A synchronization signal generating circuit for optical scanning device as set forth in (6) above, wherein the timer circuit is started up at the timing at which the output signal from the comparator changes.

(8) A synchronization signal generating circuit for optical scanning device as set forth in (6) or (7) above, wherein the signal processing circuit is arranged to generate the synchronization signal upon comparing the signal from the resonance circuit with a reference signal.

(9) A synchronization signal generating circuit for optical scanning device as set forth in any of (6) through (8) above, wherein the signal input into the timer circuit is used as the synchronization signal and arrangements are made so that the signal that is output from the timer circuit is fed back to the input side of the timer circuit.

(10) A synchronization signal generating circuit for optical scanning device as set forth in any of (6) through (8) above, wherein the signal output from the timer circuit is used as the synchronization signal.

(11) A synchronization signal generating circuit for optical scanning device as set forth in any of (6) through (10) above, wherein the timer time is set to be shorter than a period between adjacent pulses of the scanning light beam.

(12) A synchronization signal generating circuit for optical scanning device as set forth in any of (6) through (11) above, wherein the timing, at which the signal from the resonance circuit matches the level of the reference signal again after reaching the level of the reference signal once, is used for setting the scanning starting position and the timer circuit is arranged to start up at said point at which the signal from the resonance circuit matches the level of the reference signal again.

(13) A synchronization signal generating circuit for optical scanning device as set forth in (12) above, wherein the timer time is set to a duration no more than the duration between said point at which the signal from the resonance circuit matches the level of the reference signal again and the point at which the signal from the resonance circuit reaches the level of the reference signal for the first time during the resonance based on detection of the next scanning light beam.

(14) A synchronization signal generating circuit for optical scanning device as set forth in (12) or (13) above, wherein the timer time is set to a duration no less than the duration between said point at which the signal from the resonance circuit matches the level of the reference signal again and the point at which the signal from the resonance circuit reaches the level of the reference signal for the last time during the resonance based on detection of the same scanning light beam.

(15) A synchronization signal generating circuit for optical scanning device as set forth in any of (1) through (14) above, wherein the resonance circuit is arranged so that the attenuation of resonance will be completed by the time of the resonance based on the detection of the next scanning light beam.

(16) A synchronization signal generating circuit for optical scanning device as set forth in any of (1) through (15) above, wherein the resonance circuit has a parallel circuit comprised by connecting a resistor, capacitor, and a coil in parallel.

(17) A synchronization signal generating circuit for optical scanning device as set forth in any of (1) through (16) above, wherein at least one AC coupling is included in the signal transmission line of the signal processing circuit.

BRIEF DESCRIPTION OF THE DRAWINGS

FIG. 3 is a timing chart showing a relationship between a timing at which a laser light source is lit and a synchronization signal in the present invention.

FIGS. 4A to 4C are timing charts showing the operation of the synchronization signal generating circuit shown in FIG. 2;

FIG. 5 is a graph showing the frequency spectrum characteristics (signal intensity distribution) of the signal of period Tp which is output from the photodiode in the present invention;

FIG. 8 is a circuit diagram (block diagram) of the second embodiment of the synchronization signal generating circuit for optical scanning device by the present invention.

FIGS. 9A to 9E are timing charts showing the operation of the synchronization signal generating circuit shown in FIG. 8;

DETAILED DESCRIPTION OF THE PREFERRED EMBODIMENTS

Now, a description will be given in more detail of preferred embodiments of the present invention with reference to the accompanying drawings.

Figure 1:
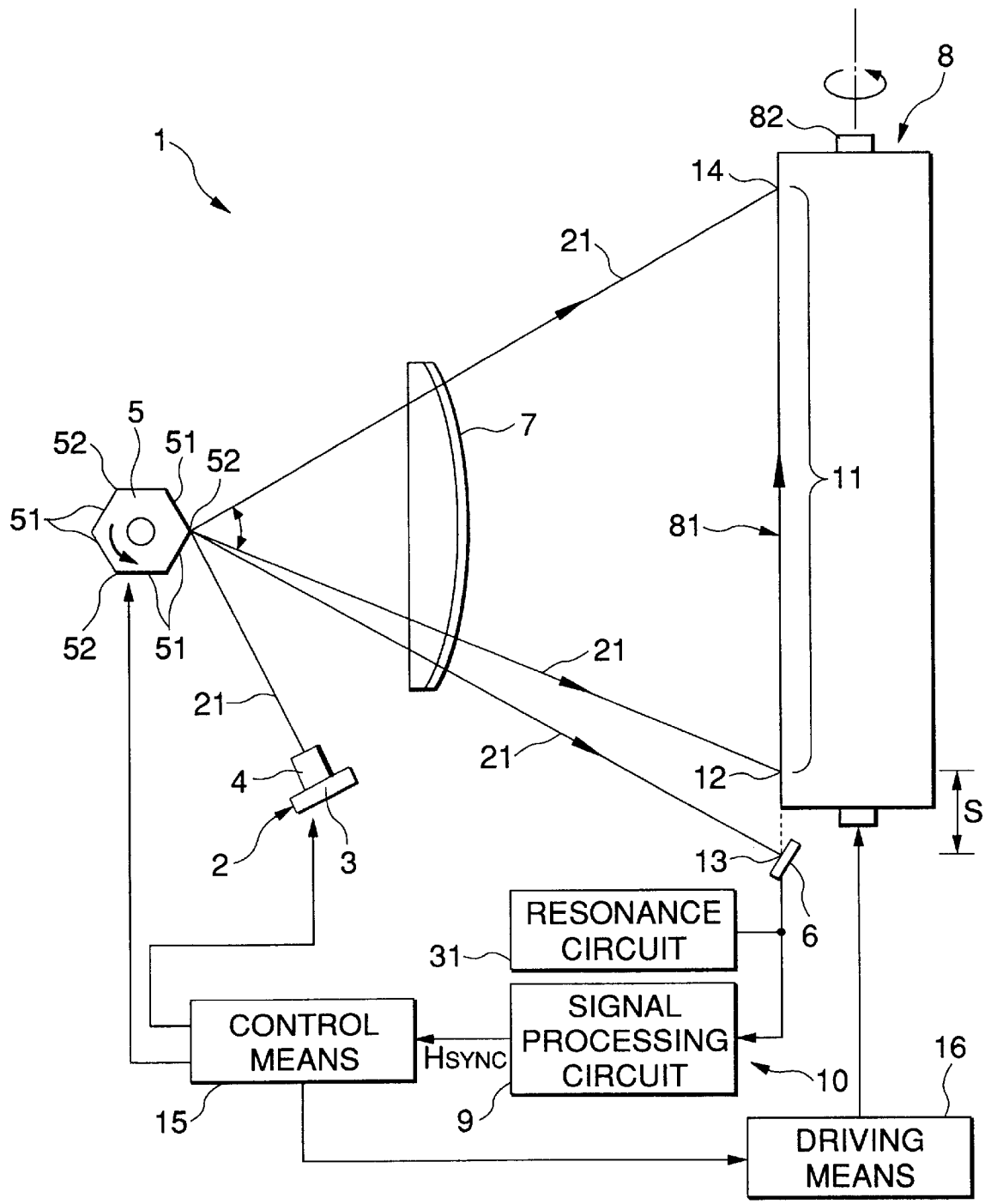
FIG. 1 is a plan view showing a synchronization signal generating circuit for optical scanning device according to a first embodiment of the invention.
Figure 2:
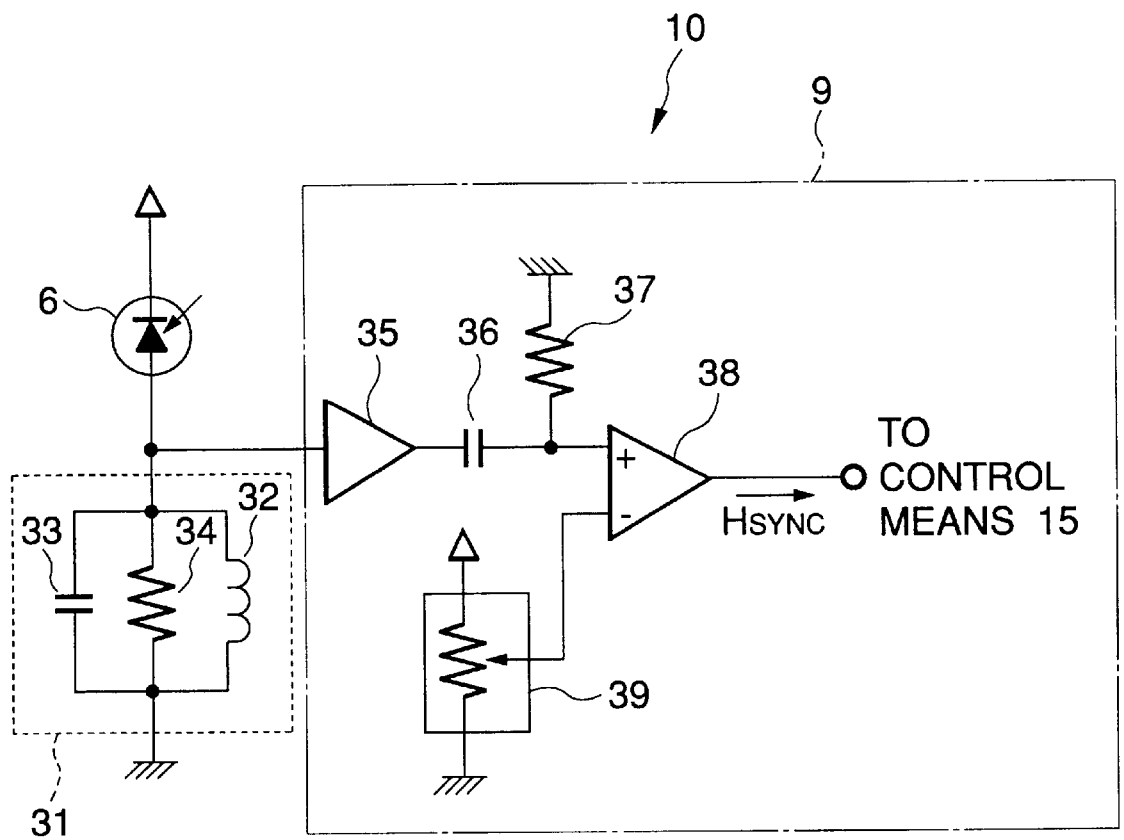
FIG. 2 is a circuit diagram of the synchronization signal generating circuit for optical scanning device shown in FIG. 1.

FIG. 1 is a plan view showing a synchronization signal generating circuit for an optical scanning device according to first embodiment of the present invention, and FIG. 2 is a circuit diagram showing the synchronization signal generating circuit shown in FIG. 1.

As shown in these drawings, an optical scanning device (laser scanning unit) 1 has a light source unit 2, a rotating polygon mirror 5, which reflects a laser beam 21 from a light source unit 2, an unillustrated motor that rotates rotating polygon mirror 5, an fθ lens 7, a photosensitive drum 8, and a synchronization signal generating circuit 10, comprised of a photodiode 6, which is the light receiving element (photoelectric conversion element), a resonance circuit 31, and a signal processing circuit 9.

Light source unit 2 is comprised of a laser light source 3, comprised in turn of a semiconductor laser, and a frontal optical system 4, comprised in turn of a collimating lens and condenser lens disposed at the light emitting side of laser light source 3. Laser beam 21 from light source unit 2 is converged onto reflecting surface 51 of rotating polygon mirror 5. The timing at which laser light source 3 is lit or unlit is controlled by a control means 15 comprised of a microcomputer, etc.

A rotating polygon mirror (polygon mirror) 5 has the shape of a regular polygon and is rotated at a constant speed by the unillustrated motor. The illustrated rotating polygon mirror 5 has six reflecting surfaces 51 formed on its outer periphery. Each reflecting surface 51 is a flat surface and adjacent reflecting surfaces 51 respectively form an equal angle (120°) with each other. Each reflecting surface 51 is for example comprised of an aluminum-deposited layer.

As shown in FIG. 1, laser beam 21 from light source unit 2 is reflected by reflecting surface 51 of the rotating polygon mirror 5 and in this process, the point of incidence of laser beam 21 on reflecting surface 51 moves from a corner part 52 at one side to a corner part 52 at the other side via the central part of reflecting surface 51 and the direction of reflection of the reflected light is varied within a predetermined angular range in accompaniment with the rotation of rotating polygon mirror 5. This angular range of reflected light shall be referred to hereinafter as the deflection angle.

In the arrangement illustrated, a rotating polygon mirror 5 is rotated at a constant speed in the counterclockwise direction of FIG. 1 by a motor. The rotation of the motor is controlled by control means 15.

An fθ lens 7 is installed in a range that covers the abovementioned deflection angle. Since the direction of laser beam 21 reflected by rotating polygon mirror 5 changes at a constant angular speed, laser beam 21 is compensated by this fθ lens 7 to move across light receiving surface 81, to be described later, at a uniform speed. This fθ lens 7 also compensates for the tilting of each reflecting surface 51 of rotating polygon mirror 5.

After passing through fθ lens 7, laser beam 21 is converged onto the light receiving surface (image formation surface) 81 formed on the outer peripheral face of photosensitive drum 8. When rotating polygon mirror 5 rotates by 60°, laser beam 21 is deflected once across the range of the deflection angle, and is thus scanned (main scanned) once across light receiving surface 81 in one direction of rotation axis 82 of photosensitive drum 8.

Subscanning is also performed, for example, by rotating photosensitive drum 8 in a predetermined direction. Each time rotating polygon mirror 5 is rotated by 60°, in other words, each time one main scan is performed across light receiving surface 81, photosensitive drum 8 rotates by an amount corresponding to one dot and then the main scan for the next line is performed. Thus each time rotating polygon mirror 5 rotates by one full turn, six main scans, in other words, scanning corresponding to the drawing of six dots worth is performed in the subscanning direction.

Photosensitive drum 8 is rotated by a driving means 16, which includes a motor, speed change gear, etc. Driving means 16 is controlled in the amount of rotation of photosensitive drum 8, timing of rotation, etc. by control means 15.

By the performing of such a main scan and sub scan, an electrostatic latent image, corresponding to the illumination points (dots) of laser beam 21, is formed on the outer peripheral face of photosensitive drum 8. Toner supplied to the outer peripheral face of photosensitive drum 8 from a toner supply unit (not illustrated) is then adsorbed in correspondence with this electrostatic latent image, and drawing onto recording paper (not illustrated) is accomplished by the transfer and fixing of this toner image onto recording paper.

A photodiode 6 is installed at a predetermined position along the main scanning line of laser beam 21. As shall be described later, a resonance circuit 31 and a signal processing circuit 9 are connected to this photodiode 6, and the synchronization signal generating circuit 10 of the present invention is comprised of this photodiode 6, resonance circuit 31, and signal processing circuit 9.

The scanning range of main scanning, in other words, the drawing range 11 on the recording paper, is set on light receiving surface 81 of photosensitive drum 8, and one end of this range becomes the scanning starting position, in other words, the drawing starting position 12 at which the optical modulation operation of laser light source 3 based on drawing data is started. The other end of the range becomes the scanning ending position (drawing ending position) 14.

For drawing onto a recording paper (not illustrated), there is a need to specify the drawing starting position 12 and to keep this position fixed in the subscanning direction. Thus the signal obtained from signal processing circuit 9 upon illumination of laser beam 21 onto photodiode 6 is used as the synchronization signal (horizontal synchronization signal) HSYNC and the position reached after the elapse of a certain amount of time from synchronization signal HSYNC is deemed to be the drawing starting position 12. In other words, synchronization signal generating circuit 10 is provided to obtain synchronization signal HSYNC for detecting drawing starting position 12.

Photodiode 6 is thus installed at a synchronization signal generation light receiving position 13, which is located along the light path of laser beam 21, outside drawing range 11, and separated from drawing starting position 12 by a predetermined distance S in the main scanning direction. Synchronization signal generating circuit 10 shall now be described.

As shown in FIG. 2, resonance circuit 31 is connected to photodiode 6 as its load circuit. This resonance circuit 31 is comprised of a parallel circuit arranged by connecting a coil 32, capacitor 33, and resistor 34 in parallel.

The respective constants (circuit constants) that define the sharpness of resonance Q (Q value), resonance frequency f0, etc. of resonance circuit 31, in other words, inductance L of coil 32, static capacitance C of capacitor 33, and resistance R of resistor 34 are set for optimal detection (generation) of synchronization signal HSYNC based on the response waveform, etc. output from photodiode 6. The respective constants of resonance circuit 31 shall be described in detail later.

In this synchronization signal generating circuit 10, the frequency component necessary for synchronization signal detection is taken out as a voltage signal from the current signal that flows through photodiode 6 by the actions of resonance circuit 31 and appears at the junction of photodiode 6 and resonance circuit 31. The detection means is comprised of this photodiode 6 and resonance circuit 31.

An amplifier 35 is connected to the junction of photodiode 6 and resonance circuit 31. A capacitor (coupling capacitor) 36, for cutting (eliminating) the DC component, is connected to the output side of amplifier 35. In other words, in this synchronization signal generating circuit 10, the coupling for transmission of signals from amplifier 35 to comparator 38 takes on the form of AC coupling.

The abovementioned capacitor 36 is connected to the positive input terminal of comparator 38. One end of a resistor 37, which is grounded on the other end, is connected to a point between capacitor 36 and the positive input terminal of comparator 38.

A reference voltage generator 39, which is variable in reference voltage, is connected to the negative input terminal of comparator 38, and a reference voltage (threshold voltage) is applied from this reference voltage generator 39.

As shown in FIG. 4B, the abovementioned reference voltage is set to a predetermined value that is sufficiently smaller than the peak value of the first waveform (voltage waveform) 44 during resonance and sufficiently larger than the peak value of the waveform (voltage waveform) 45 adjacent to and in the same direction as waveform 44.

In this synchronization signal generating circuit 10, the signal processing circuit 9, which processes the output signal from resonance circuit 31, etc., is comprised of the abovementioned amplifier 35, capacitor 36, resistor 37, comparator 38, and reference voltage generator 39.

Next, an example of the method for setting the resonance frequency f0 and the Q value of resonance circuit 31 shall be explained.

First, the frequency spectrum of the signal of period Tp output from photodiode 6 as shown in FIG. 4A is measured in the condition where a resistive load is connected instead of resonance circuit 31 as the load circuit to photodiode 6. The frequency fmax, at which the intensity of the spectrum (signal intensity) is the maximum, is determined and resonance frequency f0 is set equal or close to this frequency fmax. The abovementioned period Tp is the time it takes for rotating polygon mirror 5 to rotate by the amount corresponding to one surface, that is, Tp is the period of scanning of laser beam 21, and is determined by the number of reflecting surfaces 51 of rotating polygon mirror 5 and the speed of rotation of rotating polygon mirror 5. Since resonance frequency f0 is set in this manner, a stable synchronization signal can be generated.

FIG. 5 is a graph showing the frequency spectrum characteristics (signal intensity distribution) of the signal of period Tp output from photodiode 6. The frequency spectrum characteristics shown in FIG. 5 can be determined for example by means of a spectrum analyzer, and the abovementioned frequency fmax can be read from the graph of frequency spectrum characteristics.

Next, the Q value is set, mainly by adjusting the resistance of resistor 34, so that the attenuation of resonance will be completed by the time of the resonance based on the next scan (detection of the next scanning light beam), the peak value of the first waveform (voltage waveform) 44 during resonance will be greater than the reference voltage (threshold voltage), and the peak value of the waveform (voltage waveform) 45 adjacent to and in the same direction as waveform 44 will be less than the reference voltage as shown in FIG. 4B. Put in another way, the Q value is set so that waveform 44 will cross the reference voltage twice and the waveform (voltage waveform) of the signal output from resonance circuit 31 will attenuate (i.e. the oscillation converges) by the time of the resonance based on the next scan without crossing the reference voltage after the second crossing point 47 of waveform 44 and the reference voltage. The setting (adjustment) of the Q value may also be performed by changing the value of coil 32 or capacitor 33.

In setting this Q value, first, a resonance circuit 31, the Q value of which is set to a relatively small value, is connected to photodiode 6 and the waveform of the signal output from resonance circuit 31 is observed. If this signal contains a relatively large amount of noise components, the Q value is made larger and the waveform of the signal output from resonance circuit 31 is observed again. The reference voltage may also be changed in this process. Thereafter, this work is repeated until the amount of noise components in the signal output from resonance circuit 31 becomes sufficiently low and the Q value is set within a range that satisfies the conditions mentioned above.

Figure 6:
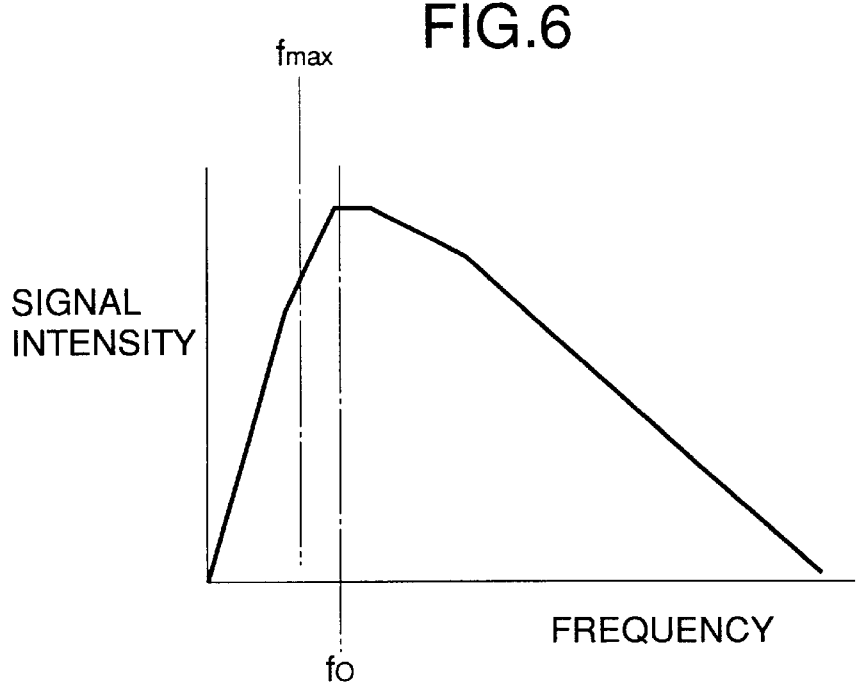
FIG. 6 is a graph showing the frequency spectrum characteristics (signal intensity distribution) of the signal (voltage waveform) output from the resonance circuit in the present invention (in the case of a small Q value)
Figure 7:
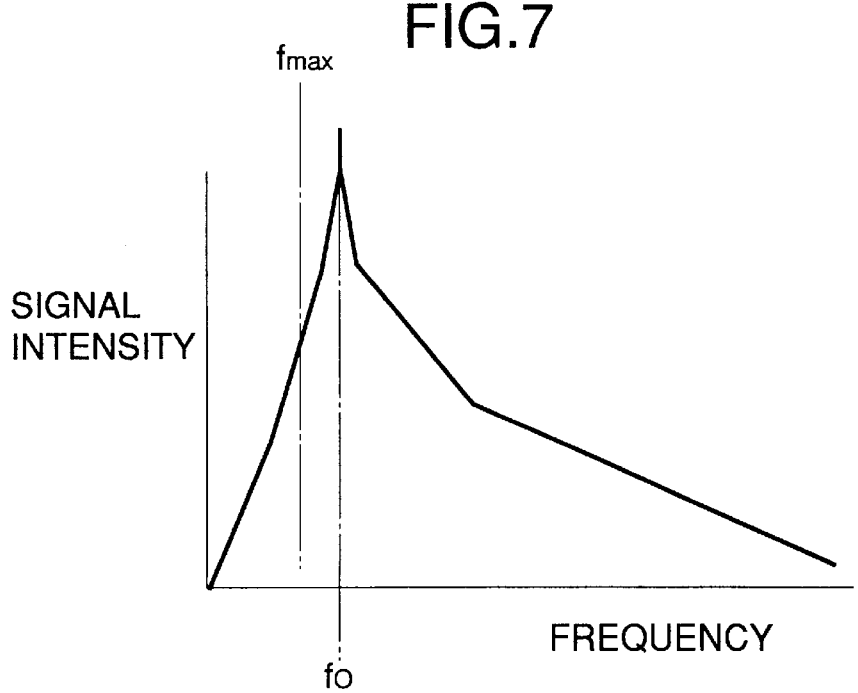
FIG. 7 is a graph which shows the frequency spectrum characteristics (signal intensity distribution) of the signal (voltage waveform) output from the resonance circuit in the present invention (in the case of a large Q value).

FIGS. 6 and 7 are graphs of the frequency spectrum characteristics (signal intensity distribution) of the signal (voltage waveform) output from resonance circuit 31.

The frequency spectrum characteristics shown in FIG. 6 are those for the case where the Q value is set to a relatively small value and the frequency spectrum characteristics shown in FIG. 7 are those for the case where the Q value is set to a relatively high value. As shown by these drawings, when the Q value is set to a higher value, the spectrum becomes steeper near the resonance frequency f0 and the noise components can be attenuated further.

Next, the actions of synchronization signal generating circuit 10 shall be described.

FIG. 3 is a timing chart that shows the relationship between the timing at which laser light source 3 is lit and the synchronization signal HSYNC for detecting drawing starting position 12 and FIGS. 4A to 4C is a timing chart that shows the operation of synchronization signal generating circuit 10.

As shown in FIG. 3, laser light source 3 is lit for a predetermined amount of time so that an auxiliary scan of positions prior to and subsequent synchronization signal generation light receiving position 13 is performed by laser beam 21. Laser beam 21 is thus received by photodiode 6, and as shall be described below, synchronization signal HSYNC is output from signal processing circuit 9 and this synchronization signal HSYNC is input into control means 15. The timing at which laser light source 3 is lit before and after synchronization signal generation light receiving position 13 is determined for example on the basis of the detection of scanning ending position 14, to be described later, of the previous main scan.

As shown in FIG. 4A, when laser beam 21 becomes incident on the light receiving surface of photodiode 6, a current, in other words, a signal of a magnitude corresponding to the amount of light received is output from photodiode 6.

If in this process a signal component of a predetermined frequency band, that is, a signal component of a frequency equal or close to resonance frequency f0 of resonance circuit 31 is output from photodiode 6, resonance, with a waveform such as that shown in FIG. 4B, occurs due to the actions of resonance circuit 31. Since this resonance is completed by the time of the next resonance as mentioned above (for example, the oscillation in this resonance ends in about one or two cycles), it will have no influence on the detection of synchronization signal HSYNC of the next auxiliary scan.

By this resonance, only the signal component in the signal output from photodiode 6 that is necessary for synchronization signal detection is taken out and output from resonance circuit 31.

Thus even when the output from photodiode 6 fluctuates as shown in FIG. 4A (for example, changes in the manner of waveform 25, 26, or 27 of the signal output from photodiode 6), the waveform of the signal output from resonance circuit 31 will be nearly the same as shown in FIG. 4B. In particular, the first crossing point 46 and the second crossing point 47 with the reference voltage will stay nearly the same.

The signal output from resonance circuit 31 is input into amplifier 35 and is amplified by this amplifier 35.

The signal output from amplifier 35 is cut off its DC component by capacitor 36 and is then input into the positive input terminal of comparator 38.

Meanwhile, the reference voltage from reference voltage generator 39 is applied to the negative input terminal of comparator 38.

At comparator 38, the voltage of the signal input into the positive input terminal is compared with the abovementioned reference voltage, and in the interval in which the signal voltage is greater (the interval from crossing point 46 to crossing point 47), a high level signal is output from comparator 38. In other words, a rectangular synchronization signal HSYNC, that rises at crossing point 46 and falls at crossing point 47 is generated at comparator 38 as shown in FIG. 4C and this synchronization signal HSYNC is output from comparator 38 and input into control means 15.

Since the respective crossing points 46 and 47 are nearly fixed in this case, the timing of synchronization signal HSYNC, in other words, the respective timing of the rise and fall of synchronization signal HSYNC will stay the same and thus a stable synchronization signal HSYNC will be obtained to enable the scanning starting position of laser beam 21 to be detected at high precision by optical scanning device 1.

In control means 15, the timing of the fall of synchronization signal HSYNC is used to specify the scanning starting position on the light receiving surface of the photosensitive drum, in other words, drawing starting position 12.

To be more specific, the time (timer set time) in which the illumination point of laser beam 21 moves across light receiving surface 81 in the main scanning direction by a distance S is set in advance by means of a timer (not illustrated) built into control means 15. This timer is started at the timing at which synchronization signal HSYNC is detected, in other words, the timing of the fall of synchronization signal HSYNC and the point at which the timer set time has elapsed is deemed to be the drawing starting position 12.

Thereafter, laser light source 3 is lit and unlit to form the desired dots in accordance with the drawing data (not illustrated) sent to control means 15 from the exterior while the main scan of laser beam 21 is performed in drawing range 11.

When scanning ending position 14 is reached, laser light source 3 is unlit, photosensitive drum 8 is rotated by an amount corresponding to one dot, and the auxiliary scan and main scan are performed in accordance with the same procedures as described above.

Next, a synchronization signal generating circuit for optical scanning device according to a second embodiment of the present invention will be described below.

FIG. 8 is a circuit diagram (block diagram) that shows the second embodiment of the synchronization signal generating circuit for optical scanning device by the present invention.

The description of the points that are in common with the above-described synchronization signal generating circuit 10 shall be omitted and only the major differences shall be explained.

Synchronization signal generating circuit 10a shown in said Figure has an OR gate (OR circuit) 55 and a timer circuit 56 at the rear stage (output side) of comparator 38 and is arranged to maintain the output level of synchronization signal HSYNC until a preset timer time (timer set time) Tset elapses.

With this synchronization signal generating circuit 10a, the output terminal of amplifier 35 is connected via capacitor 36 to the negative input terminal of comparator 38 as shown in FIG. 8. Reference voltage generator 39 is connected to the positive input terminal of comparator 38.

The output terminal of comparator 38 is connected to one of the input terminals of OR gate 55.

The output terminal of the OR gate is connected to the input terminal of timer circuit 56 and the output terminal of this timer circuit 56 is connected to the other input terminal of the abovementioned OR gate 55.

This timer circuit 56 is comprised of a one-shot multivibrator that is triggered by the rise of the input signal and outputs a high level signal until the timer time Tset elapses. The timing at which timer circuit 56 is started and the conditions for timer time Tset shall be described later.

With synchronization signal generating circuit 10a, the signal processing circuit 9a for processing the output signal from resonance circuit 31, etc. is comprised of the abovementioned amplifier 35, capacitor 36, resistor 37, comparator 38, reference voltage generator 39, OR gate 55, and timer circuit 56.

As shall be described later, with such a synchronization signal generating circuit 10a, the output of synchronization signal HSYNC is maintained at the high level by OR gate 55 and timer circuit 56 until timer time Tset elapses, regardless of the level of the signal from comparator 38. And since synchronization signal HSYNC will not be affected in any way even when the output of comparator 38 becomes inverted during this interval, the Q value can be set to a relatively high value.

However, there is a limit to the Q value, and the Q value is set so that the attenuation of the resonance will be completed by the time of the resonance based on the next scan (detection of the next scanning light beam) as shown in FIG. 9B.

Next, the actions of synchronization signal 10a and the conditions for timer time Tset of timer circuit 56 shall be explained.

FIGS. 9A to 9E are timing charts that shows the operation of synchronization signal generating circuit 10a when the Q value is set to a relatively high value.

When laser beam 21 becomes incident on the light receiving surface of photodiode 6, a current, in other words, a signal of a magnitude corresponding to the amount of light received is output from photodiode 6 as shown in FIG. 9A and resonance, with the waveform shown in FIG. 9B, occurs due to the actions of resonance circuit 31.

The signal output from resonance circuit 31 is amplified by amplifier 35, cut off its DC component by capacitor 36, and then input into the negative input terminal of comparator 38.

At comparator 38, the voltage of the signal input into the negative input terminal is compared with the reference voltage applied to the positive input terminal, and as shown in FIG. 9C, a low level signal is output from comparator 38 during the interval in which the signal voltage is greater (during the interval from crossing point 46 to crossing point 47, etc.) while a high level signal is output from comparator 38 during the interval in which the signal voltage is smaller.

The signal output from comparator 38 is input into one of the input terminals of OR gate 55.

The signal output from timer circuit 56 is input into the other input terminal of OR gate 55. The operations of this timer circuit 56 shall be described in detail later.

As shown in FIG. 9D, based on the signal from comparator 38 and the signal from timer circuit 56, a low level signal is output from OR gate 55 during the interval from crossing point 46 to crossing point 47 and a high level signal is output during other intervals. That is, a rectangular signal that falls at crossing point 46 and rises at crossing point 47 is generated at OR gate 55 and this signal is output from OR gate 55 and input into timer circuit 56.

Timer circuit 56 is started up at the timing of the rise of the signal output from the abovementioned OR gate 55, in other words, at second crossing point 47.

And as shown in FIG. 9E, timer circuit 56 outputs a high level signal until timer time TSET elapses from crossing point 47 and outputs a low level signal at other intervals. That is, a rectangular signal, that rises at crossing point 47 and falls at the point at which timer time Tset has elapsed from crossing point 47, is generated at timer circuit 56, and this signal is output from timer circuit 56 and input as synchronization signal HSYNC into control means 15 as well as into the other input terminal of the OR gate 55.

Since the output signal of timer circuit 56 is thus input into timer circuit 56 via OR gate 55, timer circuit 56 is prevented from restarting during its operation.

If the one-shot multivibrator to be used as timer circuit 56 is of a type with which restarting is prevented, OR gate 55 does not have to be provided.

At control means 15, the timing of the rise of synchronization signal HSYNC output from the abovementioned timer circuit 56 is used for setting the scanning starting position on the light receiving surface of the photosensitive drum, in other words, drawing starting position 12.

Here, if the time from second crossing point 47 to the point at which the waveform (voltage waveform) of the signal output from resonance circuit 31 crosses the reference voltage for the last time, in other words, the time from second crossing point 47 to last crossing point 48 is Tmin and the time from second crossing point 47 to the first crossing point 49 of the resonance based on the next scan (detection of the next scanning light beam) is Tmax, the timer time Tset is set to satisfy the conditions of Tset<Tp and Tmin≦Tset≦Tmax.

With this synchronization signal generating circuit 10a, until the timer time Tset elapses from second crossing point 47, the output level of synchronization signal HSYNC will not change, in other words, the high output level at crossing point 47 will be maintained even if the waveform of the signal output from resonance circuit 31 crosses the reference voltage after second crossing point 47 as the waveform 45, etc. shown in FIG. 9B.

Thus the Q value can be set higher in comparison to the previously described synchronization signal generating circuit 10, and the circuit can thereby be made less likely to be affected by unwanted frequency components and made to generate a stable synchronization signal HSYNC with less variation of the rise position.

Synchronization signal generating circuit 10a can also be used in cases where resonance occurs a plurality of times during one main scan as for example when the length of the light receiving surface of photodiode 6 in the main scanning direction is long with respect to the beam diameter of laser beam 21. This is described as follows.

FIGS. 10A to 10E are timing charts which show the operation of synchronization signal generating circuit 10a in the case where the length of the light receiving surface of photodiode 6 in the scanning direction (direction of movement of laser beam 21) is long with respect to the beam diameter of laser beam 21 and the Q value is set to a relatively low value.

Figure 10A:
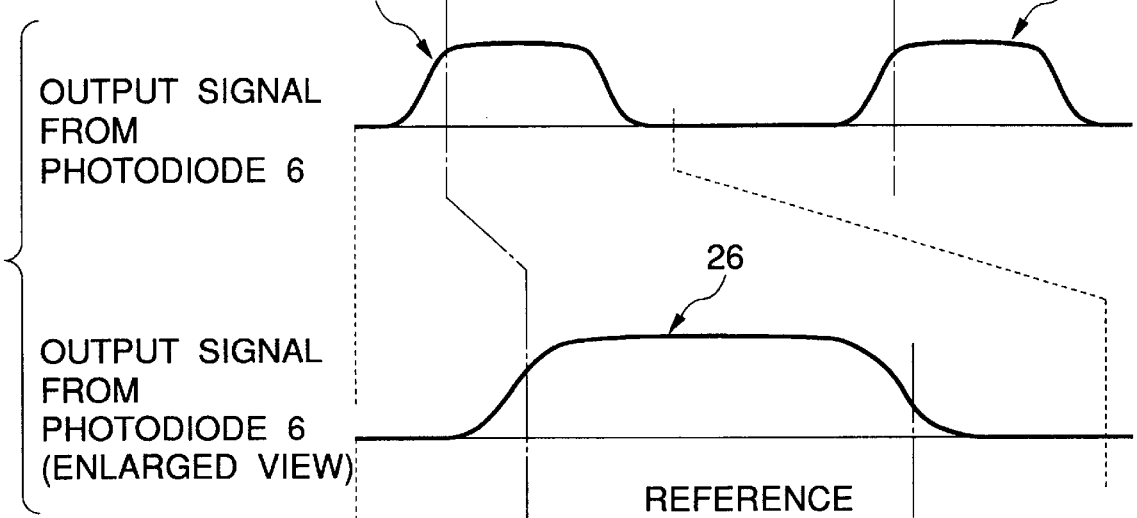
FIGS. 10A to 10E are timing charts showing the operation of the synchronization signal generating circuit shown in FIG. 8.
Figure 10B:
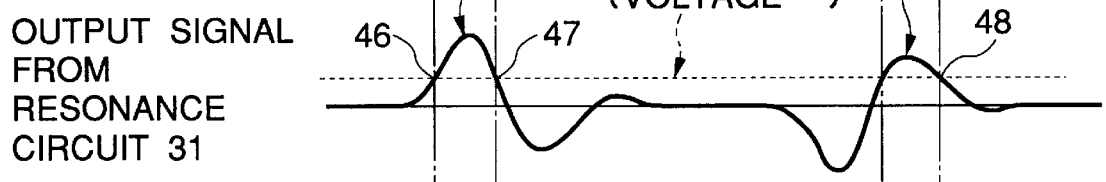
Figure 10C:

When waveform 26 of the signal output from photodiode 6 takes on a trapezoidal shape (when waveform 26 is long in the direction of the time axis) as shown in this Figure, resonance, with the waveform such as that shown in Fig. 10B, occurs at both ends of waveform 26.

Even in this case, since timer Tset is set so as to satisfy the conditions Tset<Tp and Tmin≦Tset≦Tmax and a high level signal is output from timer circuit 56 until the elapse of timer time Tset from second crossing point 47, the output level of synchronization signal HSYNC will be maintained even if waveform 61 of the signal output from resonance circuit 31 crosses the reference voltage. That is, even in the case where resonance occurs twice in a single main scan, a stable synchronization signal HSYNC can be generated without being influenced by the second resonance (waveform 61).

Furthermore, with this synchronization signal generating circuit 10a, since the signal output from timer circuit 56 is used as synchronization signal HSYNC, the interval, immediately prior to synchronization signal HSYNC and during which the signal level is low, can be made longer and synchronization signal HSYNC can thus be generated with more certainty in comparison to the case where the signal output from OR gate 55 is used as synchronization signal HSYNC as in the synchronization signal generating circuit 10b to be described below.

Next, a description will be given below of a synchronization signal generating circuit for optical scanning device according to a third embodiment of the present invention.

Figure 11:
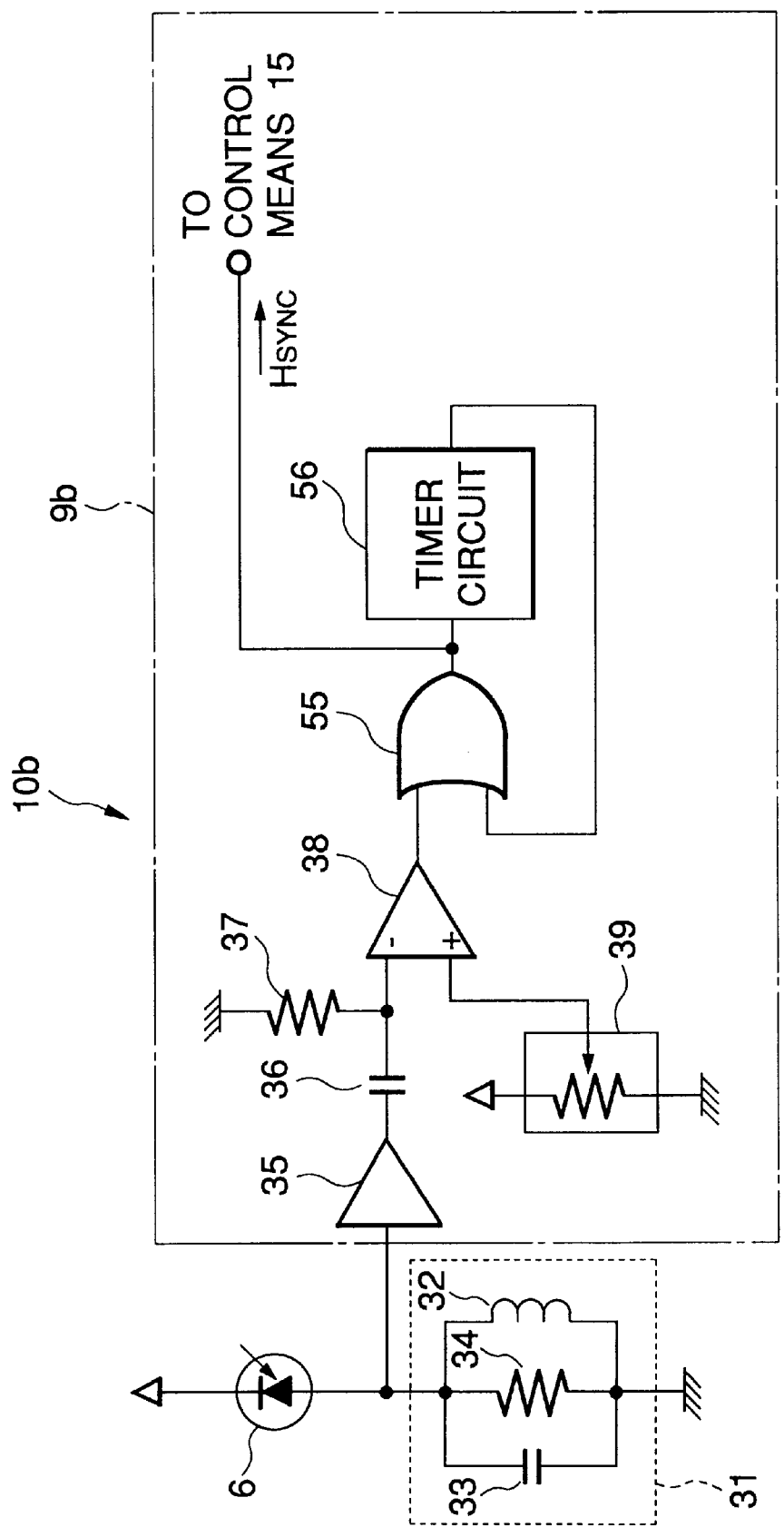
FIG. 11 is a circuit diagram (block diagram) of a synchronization signal generating circuit for optical scanning device according to a third embodiment of the present invention.
Figure 12:
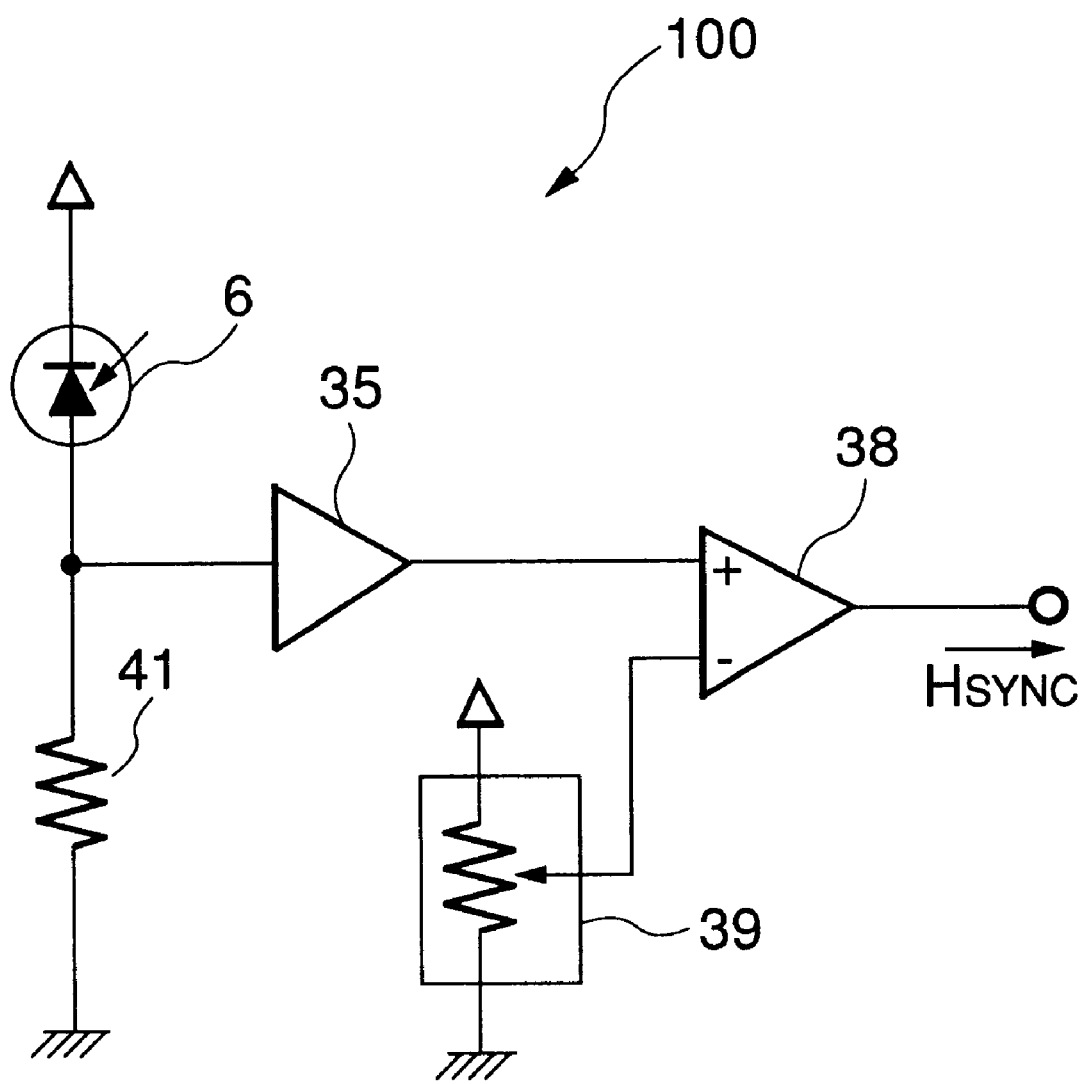
FIG. 12 is a circuit diagram which shows the circuit arrangement of a conventional synchronization signal generating circuit.
Figure 13:
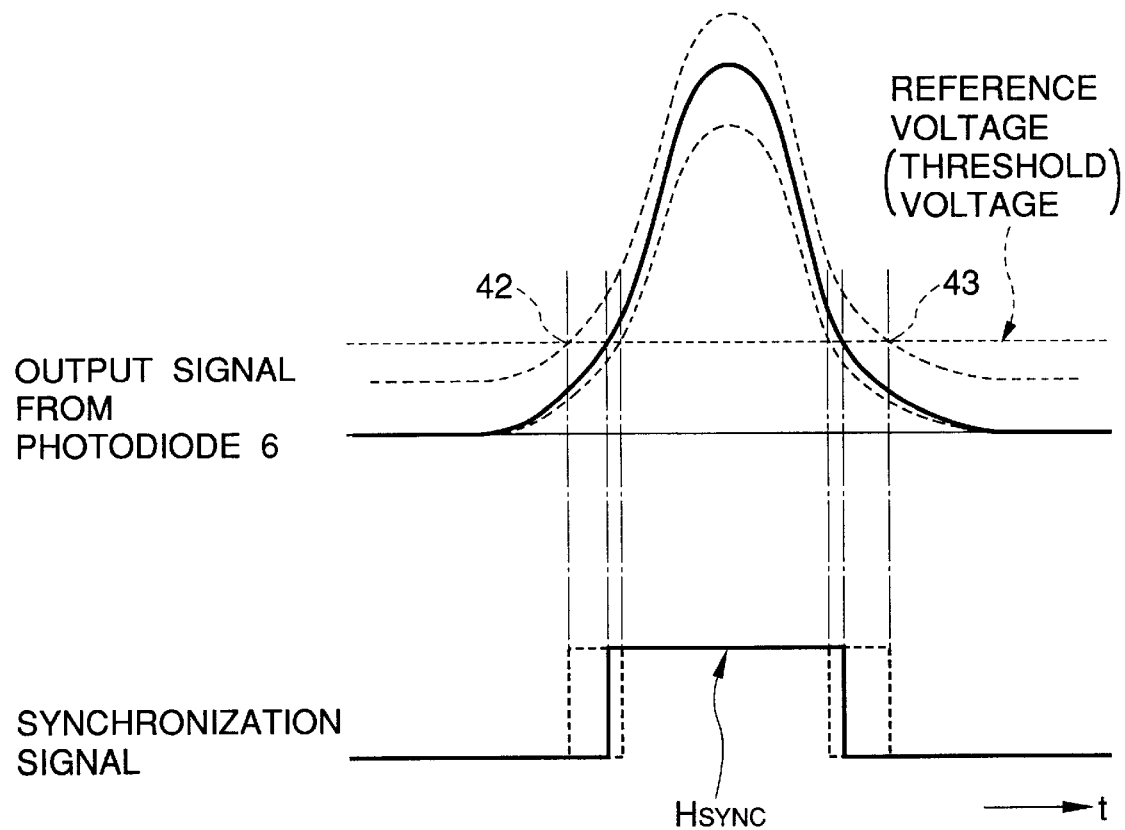
FIG. 13 is a timing chart which shows the operation of the conventional synchronization signal generating circuit.

FIG. 11 is a circuit diagram (block diagram) that shows the synchronization signal generating circuit for optical scanning device according to the third embodiment of the present invention. The description of the points that are in common with the above-described synchronization signal generating circuit 10a shall be omitted and only the major differences shall be explained.

As shown in the Figure, synchronization signal generating circuit 10b is arranged so that the signal output from OR gate 55 in signal processing circuit 9b (the signal input into timer circuit 56), in other words, the signal that rises at crossing point 47 and falls at crossing point 49 is input as synchronization signal HSYNC into control means 15.

Figure 10D:
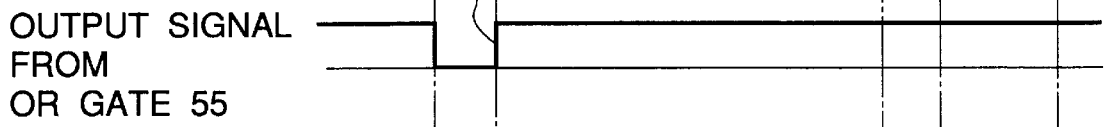
Figure 10E:
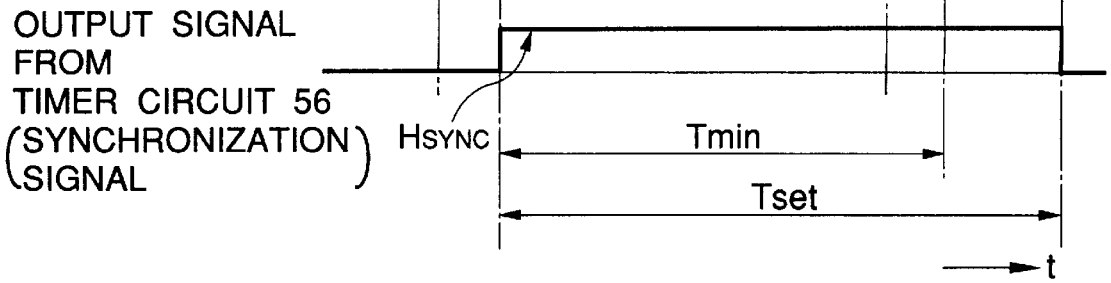

At control means 15, the timing of the rise 71 of the signal which is output from OR gate 55 as shown in FIGS. 9D and 10D is used for setting the scanning starting position on the light receiving surface of the photosensitive drum, in other words, drawing starting position 12.

As with the above-described synchronization signal generating circuit 10a, the Q value can be set to a high value in comparison to the above-described synchronization signal generating circuit 10 with this synchronization signal generating circuit 10b. Thus a more stable synchronization signal HSYNC, that is less likely to be influenced by unwanted frequency components and does not vary in rise position, can be generated and cases where resonance occurs a plurality of times during a single scan can also be accommodated for.

Furthermore, since the signal output from OR gate 55 is used as synchronization signal HSYNC in this synchronization signal generating circuit 10b, synchronization signal HSYNC can be obtained at a more prior stage in comparison to the case where the signal output from timer circuit 56 is used as synchronization signal HSYNC as in the above-described synchronization signal generating circuit 10a and thus the minute time lag between second crossing point 47 and synchronization signal HSYNC can be made smaller. That is, the generation of synchronization signal HSYNC can be performed without having to consider the time lag due to timer circuit 56.

The synchronization signal generating circuit of the present invention can be applied not only as the synchronization signal generating circuit for an optical scanning device used in a laser beam printer, laser photo-plotter, or other type of recording (writing) device but can also be applied as the synchronization signal generating circuit for an optical scanning device used in a reading device, such as bar code reader, image reader, etc.

Though the synchronization signal generating circuit of the present invention has been described above by way of the illustrated embodiments, the present invention is not limited to such and the arrangements of the respective parts can be replaced by suitable arrangements that provide the same functions.

As has been described above, with the synchronization signal generating circuit for optical scanning device by the present invention, since the load circuit of the light receiving element is comprised of a resonance circuit, just the signal components necessary for detection of the synchronization signal for the optical scanning device (signal components of a predetermined band) can be taken out and, in particular, the sensitivity can be improved through resonance.

The influence of fluctuations of the amount of light received by (output of) the light receiving element due to fluctuations of the laser beam output, tilting of the surfaces of the rotating polygon mirror, etc., mixing in of unwanted signal components (noise), fluctuations of the DC component of the circuit due to the dark current, bias current (voltage), offset voltage, etc. can be eliminated to enable generation of a stable synchronization signal and, in particular, matching of the timing of the illumination of the light beam on the light receiving element and the synchronization signal.

The variation of the scanning position of the light beam, in particular, the variation of the scanning starting position of the light beam can thereby be prevented, and in the case where the present invention is applied to the synchronization signal generating circuit for optical scanning device of a laser beam printer, the disturbance of the drawing starting position can be prevented effectively to enable high drawing (printing) quality to be obtained.

Also, since the load circuit of the light receiving element needs to be comprised only of the resonance circuit, the circuit arrangement is simple.

Further, in the case where the resonance circuit is arranged to resonate at or near the frequency at which the frequency spectrum of the signal output from the light receiving element takes on the maximum value, a more stable synchronization signal can be obtained.

Still further, due to the characteristics of the resonance circuit, there is no need to transmit a DC component. An AC coupling can thus be provided readily in the signal processing circuit and since the DC component of the circuit can be cut at the AC coupling, an even more stable synchronization signal can be obtained.

Also by the provision of a timer circuit such as that described above, the Q value can be set to a relatively high value so that a more stable synchronization signal can be generated with less likelihood of being influenced by unwanted frequency components. Cases where resonance occurs a plurality of times during a single scan can also be accommodated for.

The present disclosure relates to subject matter contained in Japanese Patent Application No. Hei 9-93083 (filed on Mar. 27, 1997) which is expressly incorporated herein by reference in its entirety.

What is claimed is:

1. A synchronization signal generating circuit for use in an optical scanning device which deflects a light beam that enters from a light source and emits the light beam as a scanning light beam that moves at a uniform speed in a predetermined direction, said synchronization signal generating circuit comprising:

detection means including a light receiving element for detecting that the scanning light beam has reached a predetermined position within a scanning range to output a detection signal, and a resonance circuit connected to said light receiving element and having a predetermined resonance frequency, for limiting band of the detection signal from said light receiving element; and a signal processing circuit for generating a synchronization signal for specifying a starting position of scanning by said scanning light beam according to the detection signal from said detection means.

2. A synchronization signal generating circuit as claimed in claim 1, wherein said resonance circuit resonates at or near a frequency at which a frequency spectrum of the detection signal output from said light receiving element takes on a maximum value.

3. A synchronization signal generating circuit as claimed in claim 1, wherein said signal processing circuit includes a comparator for comparing a signal from said resonance circuit with a reference signal to generate the synchronization signal according to a comparison result.

4. A synchronization signal generating circuit as claimed in claim 3, wherein said signal processing circuit specifies the starting position of scanning according to a timing at which the signal from said resonance circuit matches a level of the reference signal again after reaching the level of the reference signal once.

5. A synchronization signal generating circuit as claimed in claim 4, wherein said resonance circuit includes an attenuator for attenuating the signal that is input from said resonance circuit to said signal processing circuit so as to be prevented from reaching the level of the reference signal after matching the level of the reference signal again.

6. A synchronization signal generating circuit as claimed in claim 1, wherein said signal processing circuit includes a comparator for comparing the signal from said resonance circuit with a reference signal; and a timer circuit which is started up according to a signal output from said comparator, for outputting a signal of a predetermined level for a predetermined period starting from a point of startup.

7. A synchronization signal generating circuit as claimed in claim 6, wherein said timer circuit is started up at a timing when the signal output from said comparator changes.

8. A synchronization signal generating circuit as claimed in claim 6, wherein said signal processing circuit generates the synchronization signal according to a comparison result from said comparator.

9. A synchronization signal generating circuit as claim 6, wherein the signal input to said timer circuit is used as the synchronization signal and arrangements are made so that the signal that is output from said timer circuit is fed back to the input side of said timer circuit.

10. A synchronization signal generating circuit as claimed in claim 6, wherein the signal output from said timer circuit is used as the synchronization signal.

11. A synchronization signal generating circuit as claimed in claim 6, wherein a timer time is set to be shorter than a period between adjacent pulses of the scanning light beam.

12. A synchronization signal generating circuit as claimed in claim 6, wherein said signal processing circuit specifies the scanning starting position according to a timing at which the signal from said resonance circuit matches the level of the reference signal again after reaching the level of the reference signal once; and wherein said timer circuit starts up at a point at which the signal from the resonance circuit matches the level of the reference signal again.

13. A synchronization signal generating circuit as claimed in claim 12, wherein a timer time is set to a duration no more than a duration between a point at which the signal from the resonance circuit matches the level of the reference signal again and a point at which the signal from the resonance circuit reaches the level of the reference signal for the first time during the resonance based on detection of the next scanning light beam.

14. A synchronization signal generating circuit as claimed in claim 12, wherein the timer time is set to a duration no less than a duration between the point at which the signal from said resonance circuit matches the level of the reference signal again and the point at which the signal from said resonance circuit reaches the level of the reference signal for the last time during the resonance based on detection of the same scanning light beam.

15. A synchronization signal generating circuit as claimed in claim 1, wherein said resonance circuit completes the attenuation of resonance until the time of the resonance based on the detection of the next scanning light beam.

16. A synchronization signal generating circuit as claimed in claim 1, wherein said resonance circuit has a parallel circuit includes a resistor, capacitor and a coil connected in parallel.

17. A synchronization signal generating circuit as claimed in claim 1, wherein at least one AC coupling is included in the signal transmission line of said signal processing circuit.

* * * * *